(12) United States Patent
Bhatt et al.

(10) Patent No.: US 9,544,618 B1
(45) Date of Patent: Jan. 10, 2017

(54) PRESENTING CONTENT WITHIN A VENUE USING CLIENT DEVICES ASSOCIATED WITH USERS ATTENDING THE VENUE

(71) Applicant: VenueNext, Inc., Santa Clara, CA (US)

(72) Inventors: Ronak Bhatt, Cupertino, CA (US); Edan Rosenberg, Princeton Jct., NJ (US)

(73) Assignee: VenueNext, Inc., Santa Clara, CA (US)

( * ) Notice: Subject to any disclaimer, the term of this patent is extended or adjusted under 35 U.S.C. 154(b) by 0 days.

(21) Appl. No.: 14/803,701

(22) Filed: Jul. 20, 2015

(51) Int. Cl.
*H04N 21/214* (2011.01)
*H04N 21/414* (2011.01)
*H04N 21/41* (2011.01)
*H04N 21/422* (2011.01)
*H04N 21/40* (2011.01)

(52) U.S. Cl.
CPC ............ *H04N 21/214* (2013.01); *H04N 21/40* (2013.01); *H04N 21/41* (2013.01); *H04N 21/414* (2013.01); *H04N 21/4126* (2013.01); *H04N 21/41415* (2013.01); *H04N 21/422* (2013.01); *H04N 21/42202* (2013.01)

(58) Field of Classification Search
CPC ................................................ H04N 21/42202
See application file for complete search history.

(56) References Cited

U.S. PATENT DOCUMENTS

| 2014/0012930 A1* | 1/2014 | Weishaupl | H04L 51/18 709/206 |
| 2014/0311209 A1* | 10/2014 | Niederberger | G01K 15/007 73/1.06 |
| 2015/0006648 A1* | 1/2015 | Cao | H04L 51/20 709/206 |
| 2015/0012308 A1* | 1/2015 | Snyder | H04W 84/18 705/5 |

* cited by examiner

*Primary Examiner* — Justin Shepard
(74) *Attorney, Agent, or Firm* — Fenwick & West LLP

(57) ABSTRACT

A venue management system receives location information from various client devices within a venue. The venue management system identifies content for presentation within the venue and maps portions of the identified content to different client devices based on the location information received from the client devices. For example, different pixels of an image are mapped to different client devices based on location information from the client devices. The venue management system then sends portions of the content to client devices mapped to the corresponding portions, and the client devices present their mapped portion of the identified content using display devices on the client devices.

17 Claims, 6 Drawing Sheets

PRESENTING CONTENT WITHIN A VENUE USING CLIENT DEVICES ASSOCIATED WITH USERS ATTENDING THE VENUE

BACKGROUND

This invention relates generally to user interaction with a venue, and more specifically to displaying images using multiple client devices in a venue.

Venues, such as stadiums, convention centers, or amphitheaters, frequently host events attended by large numbers of users. Oftentimes, attendees to events hosted in a venue bring banners to show their passion and communicate their support to the participants of such events. For example, attendees bring banners saying "Go USA" to cheer the USA national team in a soccer match. However, these banners are small and the probability of participants in the event seeing these banners is low. Additionally, banners brought by attendees are usually printed or hand drawn to a piece of paper or fabric and unable to be changed once printed.

While many venues include display devices for presenting information to individuals attending a venue, the size of these display devices is limited and content presented by the display devices is controlled by administrators of the venue rather than individuals attending the venue. For example, a stadium has one or more screens showing a score of a game as well as a live recording of the game. Accordingly, the display devices included in a venue have limited effectiveness in allowing individuals attending the venue to express their sentiments towards participants in an event occurring at the venue.

SUMMARY

A venue is a geographic location, such as a geographic location associated with one or more structures. Examples of a venue include a stadium, a convention center, an arena, a theater, an amphitheater, or any other suitable structure or location where people may gather for an event. In various embodiments, users obtain a ticket to enter the venue and various events are performed at the venue.

To display content, such as images or videos, to individuals attending an event at a venue, individuals participating in the event at the venue, or individuals viewing a recording of the event at the venue, a venue management system associated with the venue communicates portions of the content to client devices of the individuals attending the event. Hence, different portions of the content are presented by display devices of client devices associated with different individuals attending the event. The venue management system associated with the venue maintains information associated with users attending the venue, including location information within the venue associated with users attending the venue. For instance, the venue management system receives location information received from a client device of a user attending the event and identifies a location within the venue corresponding to the received location information or receives an identifier of a seat assigned to the user associated with a client device.

The venue management system identifies content, such as an image, and maps portions of the content to various client devices within the venue based on the locations of the client devices within the venue. For example, the venue management system maps portions of an image to different client devices within the venue based at least in part on the locations of the client devices within the venue. As an example, a portion of the image is mapped to a subset of client devices having locations within a particular area of the venue, while an additional portion of the image is mapped to an additional subset of client devices having locations within an additional area of the venue. The venue management system communicates the portions of the content to the client devices mapped to the different portions of the content. For example, a portion of the image is a pixel of a specific color, so the venue management system sends a message with the specific color to client devices mapped to the portion of the image. When a client device executing an application associated with the venue management system receives the message and the user interacts with the client device, a display device of the client device presents the content identified by the message. Hence, in the preceding example, the display device of a client device executing the application associated with the venue management system presents the specific color.

The figures depict various embodiments for purposes of illustration only. One skilled in the art will readily recognize from the following discussion that alternative embodiments of the structures and methods illustrated herein may be employed without departing from the principles of described herein.

DETAILED DESCRIPTION

Venue Overview

Figure 1:
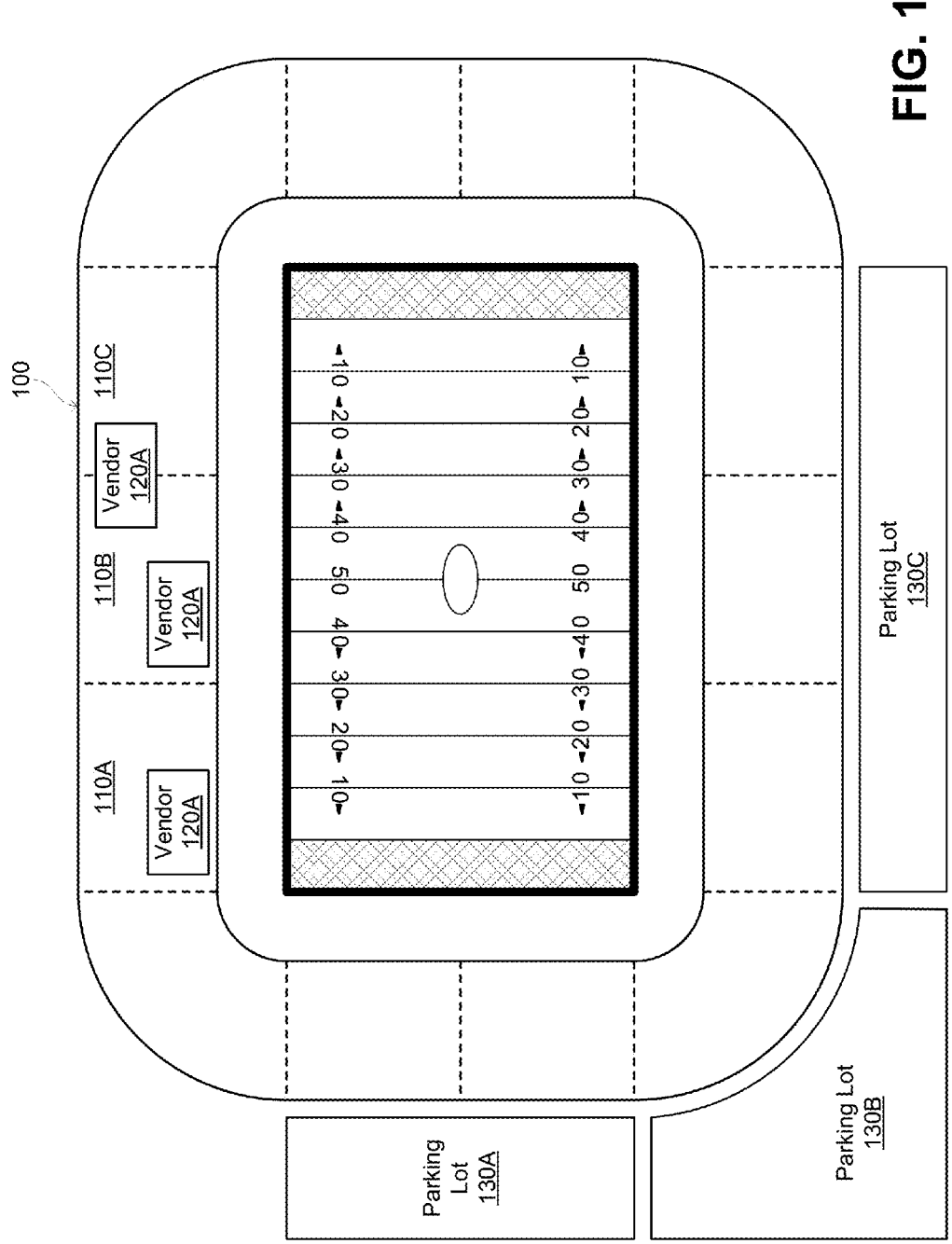
FIG. 1 is a block diagram of a venue, in accordance with an embodiment of the invention.

FIG. 1 is a block diagram of one embodiment of a venue 100. In the example of FIG. 1, the venue includes multiple regions 110A, 110B, 110C (also referred to individually and collectively using reference number 110). Additionally, one or more vendors 120A, 120B, 120C (also referred to individually and collectively using reference number 120) are included in the venue 100, and one or more parking lots 130A, 130B, 130C (also referred to individually and collectively using reference number 130) are associated with the venue 100. However, in other embodiments, different and/or additional components may be associated with or included in the venue 100.

The venue 100 is a geographic location, such as a geographic location associated with one or more structures.

Examples of a venue 100 include a stadium, a convention center, an arena, a theater, an amphitheater, or other suitable structure. One or more regions 110 are included in the venue 100, with each region 110 corresponding to an area within the venue 100. For example, different regions 110 correspond to different sections of a stadium, different aisles of a stadium or arena, different rooms in a convention center, or any other suitable area within the venue 100. In some embodiments, an area within the venue 100 is associated with multiple regions 110 having different levels of precision. For example, a specific seat in a venue 100 is associated with a region 110 identifying a section including the seat, another region 110 identifying an aisle within the section including the seat, and an additional region identifying the specific seat. While FIG. 1 shows an example venue 100 including three regions 110A, 110B, 110C, in other embodiments, a venue 110 may include any number of regions 110.

One or more vendors 120 are included in the venue 110, with each vendor providing products or services to users within the venue 110. Examples of vendors 120 include restaurants, food service providers, beverage providers, merchandise retailers, or other suitable entities providing products or services. Different vendors 120 may be associated with different regions 110 of the venue. For example, a vendor 120A is associated with a region 110A, while a different vendor 120B is associated with a different region 110B. A vendor 110 may be associated with multiple regions 110; for example, a vendor 110C is associated with a region 110B as well as with an additional region 110C. In some embodiments, a vendor 120 is associated with a region 110 based on a distance between the vendor 120 and the region 110. For example, the vendor 120 is associated with a region 110 having a minimum distance from a location associated with the vendor 120. If a location associated with a vendor 120 is within a region 110, the vendor 120 is associated with the region 110 including the vendor's associated location.

Additionally, one or more parking lots 130A, 130B, 130C are associated with the venue 110 and identify physical locations for parking vehicles. Each parking lot includes one or more spaces, each space for parking a vehicle. A price is associated with each parking lot 130 specifying an amount of compensation a user provides to an entity associated with the venue 110 for a space in the parking lot 130 to be allocated for parking a vehicle associated with the user. Different parking lots 130 may have different distances from the venue 110, and prices associated with different parking lots 130 may be inversely proportional to a distance between a parking lot 130 and the venue 110. Each parking lot 130 is also associated with a capacity specifying a maximum number of vehicles that may be parked in a parking lot 130. The capacity may be total number of spaces in the parking lot 130 or may be a maximum number of vehicles. Information may be maintained by one or more devices included in a parking lot 130 specifying a number of spaces in the parking lot 130 in which vehicles are parked, specifying a number of vehicles within a geographic area associated with the parking lot 130, or any other suitable information. For example, a device included in the parking lot 130 increments a counter when a vehicle enters the geographic area associated with the parking lot 130 or when a vehicle is parked in a space of the parking lot 130.

System Architecture

Figure 2:
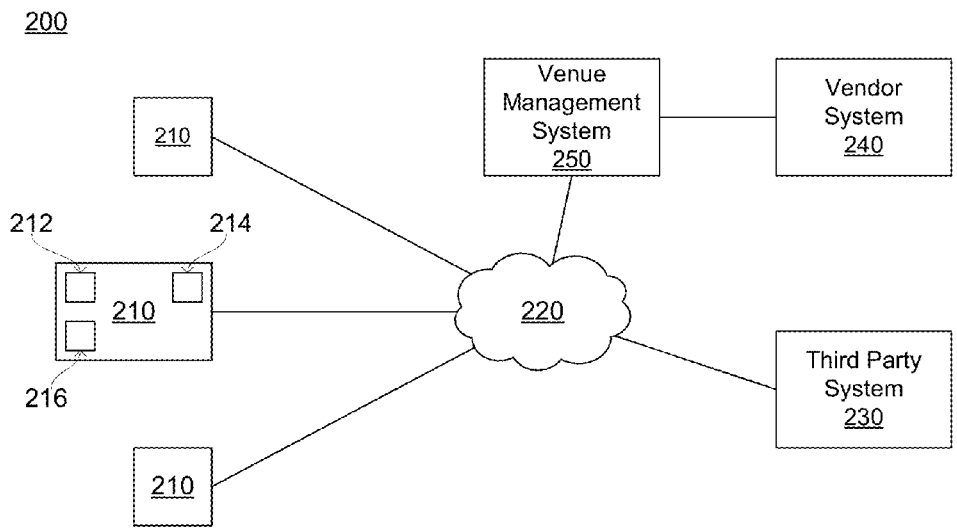
FIG. 2 is a block diagram of a system environment including a venue management system, in accordance with an embodiment.

FIG. 2 is a block diagram of a system environment 200 for a venue management system 250. The system environment 200 shown by FIG. 1 includes various client devices 210, a network 220, a third party system 230, one or more vendor systems 240, and a venue management system 250. In alternative configurations, different and/or additional components may be included in the system environment 200. The embodiments described herein may be adapted to online systems other than venue management systems.

A client device 210 is one or more computing devices capable of receiving user input as well as transmitting and/or receiving data via the network 220. In one embodiment, the client device 210 is a conventional computer system, such as a desktop computer or a laptop computer. Alternatively, the client device 210 may be a device having computer functionality, such as a personal digital assistant (PDA), a mobile telephone, a smartphone or another suitable device. A client device 210 is configured to communicate with other devices via the network 220. In one embodiment, the client device 210 executes an application allowing a user of the client device 210 to interact with the venue management system 250. For example, the client device 210 executes a browser application to enable interaction with the venue management system 250 or with one or more third party system 230 via the network 220. In another embodiment, a client device 210 interacts with the venue management system 250 through an application programming interface (API) running on a native operating system of the client device 210, such as IOS® or ANDROID™.

A display device 212 included in a client device 210 presents content items to a user of the client device 210. Examples of the display device 212 include a liquid crystal display (LCD), an organic light emitting diode (OLED) display, an active matrix liquid crystal display (AMLCD), or any other suitable device. Different client devices 210 may have display devices 212 with different characteristics. For example, different client devices 212 have display devices 212 with different display areas, different resolutions, or differences in other characteristics.

One or more input devices 214 included in a client device 210 receive input from the user. Different input devices 214 may be included in the client device 210. For example, the client device 210 includes a touch-sensitive display for receiving input data, commands, or information from a user. Using a touch-sensitive display allows the client device 210 to combine the display device 212 and an input device 214, simplifying user interaction with presented content items. In other embodiments, the client device 210 may include a keyboard, a trackpad, a mouse, or any other device capable of receiving input from a user. Additionally, the client device may include multiple input devices 214 in some embodiments. Inputs received via the input device 214 may be processed by an application associated with the venue management system 250 and executing on the client device 210 to allow a client device user to exchange information with the venue management system 250.

Additionally, a client device 210 may include one or more position sensors 216, which determine a physical location associated with the client device 210. For example, a position sensor 216 is a global positioning system (GPS) sensor that determines a location associated with the client device 210 based on information obtained from GPS satellites communicating with the GPS sensor, such as coordinates specifying a latitude and longitude of the location associated with the client device 210. As another example, a position sensor 216 determines a location associated with the client device 210 based on intensities of signals received from one or more access points (e.g., wireless access points) by the client device 110. In the preceding example, the position sensor 216 determines a location associated with the client device 210 based on signal intensity between the client device 210 and one or more wireless access points and service set identifiers (SSIDs) or media access control (MAC) addresses of the wireless access points. However, the client device 210 may include any suitable type of position sensor 216. In various embodiments, the client device 210 may include multiple position sensors 216.

The network 220 may comprise any combination of local area and/or wide area networks, using both wired and/or wireless communication systems. In one embodiment, the network 220 uses standard communications technologies and/or protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any suitable format, such as hypertext markup language (HTML) or extensible markup language (XML). In some embodiments, all or some of the communication links of the network 220 may be encrypted using any suitable technique or techniques.

One or more third party systems 130 may be coupled to the network 220 for communicating with one or more client devices 110 or with the venue management system 250. In one embodiment, a third party system 230 is an application provider communicating information describing applications for execution by a client device 210 or communicating data to client devices 110 for use by an application executing on the client device 210. In other embodiments, a third party system 230 provides content or other information for presentation via a client device 210. For example, a third party system 230 provides content related to an event occurring at the venue 110 to a client device 210 for presentation to a user; as an example, the third party system 230 provides video or audio data of a portion of an event occurring at the venue to a client device 210, allowing a user associated with the client device 210 to view the portion of the event from an alternative vantage point than the user's vantage point or to hear commentary about the portion of the event. As another example, a third party system 230 is a social networking system maintaining connections between various users and providing content for presentation to users based at least in part on the maintained connections. A third party system 230 may also communicate information to the venue management system 250, which subsequently communicates the information, or a portion of the information, to one or more client devices 110 via the network 220.

Additionally, one or more vendor systems 240 are coupled to the venue management system 250 via the network 220 or through direct connections between the vendor systems 240 and the vendor management system 150. A vendor system 240 is associated with a vendor 120 and receives orders for products or services from the venue management system 250 and provides the products or services identified by the orders. Further, a vendor system 240 provides the venue management system 250 with information describing fulfillment of orders by a vendor 120 associated with the vendor system 240. For example, the vendor system 240 provides information to the venue management system 250 specifying an estimated time to fulfill subsequently received or pending orders for products or services, an average time in which previously received orders were fulfilled, a number of unfulfilled orders received by the vendor system 240, or other suitable information. Information provided from the vendor system 240 to the vendor management system 150 accounts for orders received via the vendor management system 150 as well as orders received by the vendor 120 associated with the vendor system 240 from users visiting a location associated with the vendor 120.

Additionally, a vendor system 240 may provide information to the venue management system 250 describing products or services sold by a vendor 120 associated with the vendor system 240. For example, the vendor system 240 identifies a number of different products or services 140 sold by the vendor 120 or identifies an amount of revenue received by the vendor 120 in exchange for different products or services. Information describing sold products or services may be communicated from the vendor system 240 to the venue management system 250 as the products or services are sold or may be communicated from the vendor system to the venue management system 250 at periodic intervals. Additionally, the venue management system 250 may request information describing sales of products or services to a vendor system 240, which provides the requested information to the venue management system 250 in response to receiving the request.

The venue management system 250, which is further described below in conjunction with FIG. 3, receives content from one or more third party systems 230 or from one or more client devices 210, or generates content and provides content to users via an application associated with the venue management system 250 and executing on client devices 210. Additionally, the venue management system 250 maintains information associated with one or more parking lots 130 associated with a venue 100, such as a number of spaces in a parking lot 130 currently occupied, a price associated with a the parking lot 130, or a number of spaces in the parking lot 130 that have been purchased, as well as directions for navigating to a location associated with the parking lot 130. The venue management system 250 may communicate certain information associated with a parking lot 130 to one or more users, such as the price associated with the parking lot 130 or directions to the location associated with the parking lot 130. Associations between one or more vendors 120 and regions 110 of the venue 100 are also included in the venue management system 250, which also receives orders for products or services from one or more users and communicates the orders to one or more vendors 120 for fulfillment.

Figure 3:
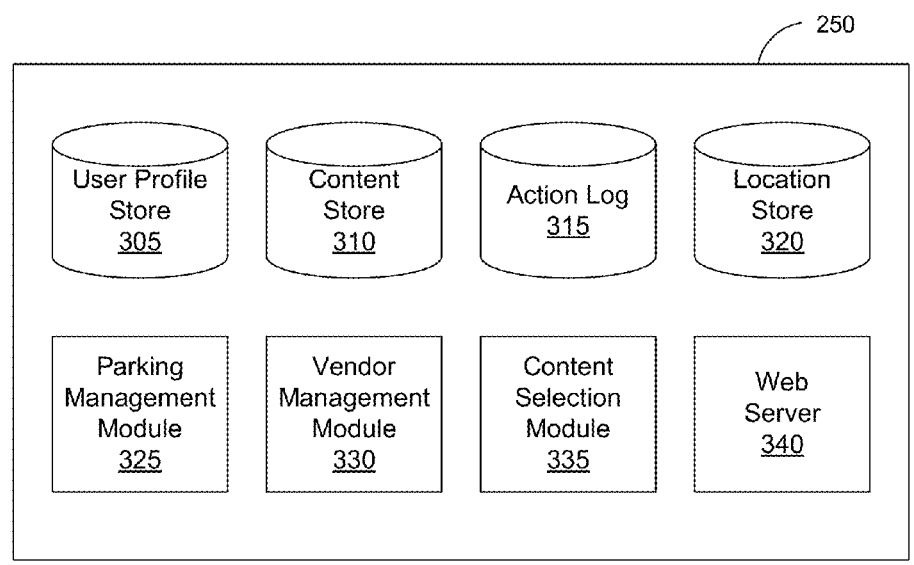
FIG. 3 is a block diagram of a venue management system, in accordance with an embodiment.

FIG. 3 is a block diagram of an architecture of a venue management system 250. The venue management system 250 shown in FIG. 3 includes a user profile store 305, a content store 310, an action log 315, a location store 320, a parking management module 325, a vendor management module 330, a content selection module 335, and a web server 340. In other embodiments, the venue management system 250 may include additional, fewer, or different components for various applications. Conventional components such as network interfaces, security functions, load balancers, failover servers, management and network operations consoles, and the like are not shown so as to not obscure the details of the system architecture.

Each user of the venue management system 250 is associated with a user profile, which is stored in the user profile store 305. A user profile includes declarative information about the user provided by the user and may also include information inferred by the venue management system 250 from actions associated with the user or from other information. In one embodiment, a user profile includes multiple data fields, each describing one or more attributes of the corresponding user. Examples of information stored in a user profile include demographic information, contact information, preferences, and location information. For example, a user profile identifies a region 110 of the venue 100 associated with a user, such as a region 110 including a seat associated with a ticket to attend the venue 100 associated with the user. A user profile may also store other information provided by the user, for example, image data or video data. Additionally, a user profile in the user profile store 205 may also maintain references to actions by the corresponding user performed on content presented by the venue management system 250 or interactions between the corresponding user captured by one or more vendor systems 240 and communicated to the venue management system 250. For example, a user profile identifies prior orders for products or services the venue management system 250 received from a user and communicated to one or more vendor systems 150.

In some embodiments, a user profile includes a status associated with the user. The venue management system 250 may provide different functionality to a user based on the user's status. For example, the venue management system 250 communicates certain types of messages to client devices 210 associated with users having a specific type of status and does not communicate the certain types of messages to client devices 210 associated with users that do not have the specific type of status. As another example, the venue management system 250 presents less advertisement content to users having specific statuses. The status may be based on a frequency with which the user is associated with tickets to attend the venue 100 or an amount of money the venue management system 250 has received from the user (e.g., based on an amount the user has spent on tickets to attend the venue 100). Additionally, a user may provide an amount of compensation to the venue management system 250 for a specific status to be associated with the user. For example, the user provides the venue management system 250 with an amount of compensation per year or per month for the venue management system 250 to associate a specific status with the user.

The content store 310 stores objects that each represents various types of content received from one or more third party systems 230 or generated by the venue management system 250. Examples of content represented by an object include video data associated with an event occurring at the venue 100, image data associated with an event occurring at the venue 100, audio data associated with an event occurring at the venue 100, text data associated with an event occurring at the venue 100, information associated with the venue 100 or with the location of the venue 100, or other suitable. Additionally, content may be received from applications associated with a third party system 230 and executing on client devices 210 associated with users of the venue management system 230. In one embodiment, objects in the content store 210 represent single pieces of content, or content "items."

The action log 315 stores information describing actions performed by venue management system users internal to or external to the venue management system 250. For example, actions performed by a user on a third party system 230 that communicates information to the venue management system 250 are stored in the action log 315 along with information describing actions performed by the user through the venue management system 250. Examples of actions include: ordering a product or service from a vendor 120 included in the venue 100, checking-into the venue, accessing content provided by the venue management system 250 or provided by a third party system 230 that communicates with the venue management system 250, providing a review of a product, service, or vendor 120 to the venue management system 250 or to a third party system 230 that communicates with the vendor management system 250, providing a comment associated with the venue 100 or with an event occurring at the venue 100 to the venue management system 250 or to a third party system 230 that communicates with the venue management system 250. However, any suitable action may be stored in the action log 315 and associated with a user profile in the user profile store 305. Information in the action log 315 may identify the user performing an action, a type of the action, a description of the action, a time associated with the action, or any other suitable information. In some embodiments, data from the action log 315 is used to infer interests or preferences of a user, augmenting interests included in the user's user profile and allowing a more complete understanding of user preferences.

The action log 315 may also store user actions taken on a third party system 230, such as an external website, and communicated to the venue management system 250. For example, an e-commerce website may recognize a user of the venue management system 250 through a plug-in enabling the e-commerce website to identify the venue management system user. Because users of the venue management system 250 are uniquely identifiable, third party systems 230 may communicate information about a user's actions outside of the venue management system 250 to the venue management system 250 for association with the user. Hence, the action log 315 may record information about actions users perform on a third party system 230, such as purchases made, comments on content, or other information a user authorizes a third party system 230 to communicate to the vendor management system 250.

The location store 320 includes physical locations associated with various regions 110 of the venue 100. In various embodiments, the location store 320 includes a region identifier associated with each region 110 and information identifying a geographic area associated with the region identifier. Any suitable information may identify the geographic area associated with a region identifier. Example information identifying a geographic area of a region 110 include: physical coordinates specifying boundaries of a region 110 and an identifier of a portion of the venue 100 including the region 110. Additionally, the location store 320 includes data associating vendors 120 with one or more regions 110 of the venue 100. A vendor identifier uniquely associated with a vendor 120 is associated with a region identifier, with the association stored in the location store 320. Multiple vendors 120 may be associated with a region 110 of the venue 100.

In some embodiments, the location store 320 also associates location information with users of the venue management system 250. A client device 210 communicates location information to the venue management system 250, which may store the location information in the location store 320 or in the user profile store 305 in association with the user. Based on the received information, the venue management system 250 may determine a region 110 of the venue including the location information and associate the region identifier of the determined region with a user profile corresponding to the user. If the venue management system 250 receives modified location information from the client device 210, the venue management system 205 may modify the determined region 110 if a different region includes the modified location information. Alternatively, one or more sensors included in the venue 100 identify a client device

210 and determine a location associated with the client device 210. Based on the determined location, the venue management system 250 identifies a region 110 including the client device 110 and stores a region identifier of the region 110 in association with a user identifier of a user associated with the client device 210. In various embodiments, information identifying a location associated with the client device 210 (e.g., latitude and longitude) is also stored in the location store 320 in association with an identifier associated with the user associated with the client device 210. Additionally, the venue management system 250 may assign a location to a user and store the assigned location in association with the user in the location store 320. For example, when a user purchases a ticket to enter the venue 100, the ticket is associated with a location assigned to the user, and the location store 320 includes information associating the location assigned to the user from the ticket with an identifier associated with the user.

The parking management module 325 includes information identifying parking lots 130 associated with the venue and describing various parking lots 130. Each parking lot 130 is associated with a lot identifier that uniquely identifies a parking lot 130. Characteristics of a parking lot 130 are stored in the parking management module 325 in association with a lot identifier corresponding to the parking lot 130. Characteristics of a parking lot 130 include a capacity for the parking lot 130 that specifies a maximum number of vehicles capable of being parked in the parking lot 130 and a price associated with the parking lot 130 for allocating a space in the parking lot 130 to a vehicle. Additional characteristics of a parking lot 130 include one or more locations associated with the parking lot 130 (e.g., entrances) and directions to the location associated with the parking lot 130. Directions from one or more locations associated with the parking lot 130 to the venue 100 may also be maintained by the parking management module 325.

Certain characteristics of a parking lot 130 are modified based on information is received by the venue management system 250. As users purchase spaces in a parking lot 130, the parking management module 325 maintains a number of purchased spaces associated with the parking lot 130. Additionally, when a vehicle enters a parking lot 130, information is communicated from the parking lot to the venue management system 250, where the parking management module 325 maintains a number of vehicles currently occupying the parking lot 130 or a number of currently occupied spaces in the parking lot 130. In some embodiments, a ticket is scanned or other information is captured by a device (e.g., scanner, card reader, terminal) when a vehicle enters the parking lot 130; the device communicates an indication that information was captured to the venue management system 250, causing the parking management module 325 to increment a number of spaces in the parking lot 130 currently associated with vehicles or to increment a number of currently occupied spaces in the parking lot 130. Thus, the parking management module 325 maintains a number of spaces in a parking lot 130 that are currently occupied by vehicles and modifies the number of currently occupied spaces as vehicles are parked in the parking lot.

Based on a number of spaces currently associated with vehicles in various parking lots 130, the parking management module 325 may communicate messages to client devices 210 identifying one or more of the parking lots 130. In one embodiment, the parking management module 325 selects a parking lot 130 based on a difference between a number of previously purchased spaces in the parking lot 130 and a number of currently occupied spaces in the parking lot 130. For example, the parking management module 325 selects a parking lot 130 having at least a threshold difference between a number of previously purchased spaces and a number of currently occupied spaces, which indicates there are at least the threshold number of unoccupied spaces in the selected parking lot 130. To increase the number of vehicles in the selected parking lot 130, the parking management module 325, the parking management module communicates a message to client devices 110 associated with one or more users identifying the selected parking lot. The message may indicate a number of unoccupied spaces in the selected parking lot 130 as well as the price associated with the selected parking lot 130. In some embodiments, the parking management module 325 modifies the price associated with the selected parking lot 130 to encourage users to park vehicles in spaces of the selected parking lot. The parking management module 235 may also modify a price associated with the selected parking lot 130 to encourage users to park vehicles in spaces of the selected parking lot 130. For example, the parking management module 325 decreases a price of the selected parking lot 130 to increase likelihoods of users purchasing spaces in the selected parking lot 130.

The parking management module 325 also receives information describing traffic conditions within a threshold distance of the parking lot 130 associated with the user and determines the directions for communication to the user based at least in part on the traffic conditions. Information describing the traffic conditions includes a number of currently occupied spaces in one or more additional parking lots 130, such as additional parking lots 130 within a threshold distance of the parking lot 130 associated with the user. Based on the information describing the traffic conditions, the parking management module 325 may modify the directions to one or more locations associated with the parking lot associated with the user. For example, the parking management module 325 modifies the directions to a location associated with the parking lot 130 to avoid one or more additional parking lots 130 with at least a threshold number of currently occupied spaces or to avoid one or more geographic regions having at least a threshold number or density of vehicles. As traffic conditions change, the parking management module 325 may further modify the direction to a location associated with the parking lot 130 and communicate the further modified directions to the client device 210 associated with the user, allowing a user to bypass congestion when travelling to the parking lot 130 associated with the user.

The vendor management module 330 receives orders for products or services from client devices 210 associated with users and communicates the orders to one or more vendor systems 240 of vendors 120 associated with the venue 100. In various embodiments, the vendor management module 330 includes vendor profiles each associated with one or more vendors 120 associated with the venue 100. A vendor profile includes a vendor identifier uniquely identifying a vendor 120 and additional information associated with the vendor 120, such as one or more regions 110 of the venue 100 associated with the vendor 120 and information for communicating with a vendor system 240 associated with the vendor 120. Further examples of information associated with the vendor 120 and included in a vendor profile include: contact information, hours of operation, a listing of products or services provided by the vendor 120, a current inventory or products maintained by the vendor 120, and a current time for the vendor 120 to fulfill received orders. However, in other embodiments, additional or different information may be included in the vendor profile. One or more users authorized by the venue management system 250 may communicate information to the vendor management system 330 to modify regions 110 of the venue associated with one or more vendors 120.

When the vendor management module 330 receives an order identifying a product or service and identifying a vendor 120 from a user, the vendor management system 330 communicates the order to a vendor system 240 corresponding to the identified vendor 120. The vendor 120 may subsequently deliver the product or service identified by the order to the user or may communicate a notification to the user via the venue management system 250 when the order is fulfilled. To expedite delivery of products or services, the vendor management module 330 may associate different vendors 120 with different regions 110 of the venue 100 to reduce time for users to receive products or services delivered by vendors 120. The vendor management module 330 may modify regions 110 of the venue 100 associated with a vendor 120 by modifying identifiers of regions 110 included in a vendor profile of a vendor 120. In some embodiments, the vendor management module 330 modifies regions 110 associated with a vendor 120 based on a number or a frequency of orders received from users associated with different regions 110 as well as a time to fulfill orders by different vendors 120, products or services offered by different vendors 120 or a number of orders received by different vendors 120. When modifying regions 110 associated with a vendor 120 or vendors 120 associated with a region, the venue management system 330 may account for products or services provided by various vendors 120 so similar products or services are provided to users in a region 110 before and after modification of the vendors 120 associated with the region 110.

Additionally, the vendor management module 330 receives information from a vendor system 240 and communicates the information to one or more client devices 210 for presentation to users. For example, the vendor system 240 communicates a time to fulfill an order, an estimated time to fulfill an order, a number of previously received orders that have yet to be fulfilled, or other suitable information to the vendor management module 330, which provides at least a subset of the information to a client device 210 for presentation to a user. As another example, a vendor system 240 communicates a message to the venue management module 330 including a user identifier, an order identifier (or a description of an order), and an indication that an order corresponding to the order identifier has been fulfilled by a vendor. The vendor management module 330 identifies a user corresponding to the user identifier from the user profile store 305 and communicates the message to a client device 210 associated with the user.

As vendors 120 may deliver products to users in various regions 110 of the venue 100 to fulfill orders received from various users, in some embodiments, the vendor management module 330 regulates communication of orders received from client devices 210 associated with users to vendor systems 240 associated with various vendors 120. When the vendor management module 330 receives an order for a product or a service from a client device 210 associated with a user, the vendor management module 330 stores the received order in a queue for a specified time interval before communicating the order to a vendor system 240 corresponding to a vendor 120 identified by the order. If the vendor management system 330 receives additional orders from users having one or more characteristics matching or similar to the order stored in the queue and identifying the vendor 120 identified by the order while the order is stored in the queue, the vendor management module 330 generates a group including the additional orders and the order stored in the queue and communicates the group or orders to a vendor system 240 associated with the vendor 120 to be fulfilled. For example, the vendor management system 330 generates a group including additional orders associated with users having a location matching a location of a user associated with an order stored in the queue. As additional examples, the vendor management system 330 generates a group including orders identifying products or services matching, or similar to, a product or service specified by an order stored in the queue or generates a group including orders identifying products or services having times for fulfillment within a threshold value of a time for fulfillment of the order stored in the queue. Communicating a group of orders having one or more matching or similar characteristics to a vendor system 240 allows the vendor 120 associated with vendor system 240 to more efficiently fulfill orders from users.

The content selection module 335 selects one or more content items for communication to a client device 210 for presentation to a user. Content items eligible for presentation to the user are retrieved from the content store 310, from a third party system 230, or from another source, by the content selection module 335, which selects one or more of the content items for presentation to the user. A content item eligible for presentation to the viewing user is a content item associated with at least a threshold number of targeting criteria satisfied by characteristics of the user or is a content item that is not associated with targeting criteria. For example, a content item associated with targeting criteria specifying a threshold distance of the venue 100 is identified as eligible for presentation to users associated with locations within a threshold distance of the venue 100. As another example, a content item associated with targeting criteria specifying attendance of an event at the venue 100 is identified as eligible for presentation to users attending the event or who have indicated they will attend the event. In various embodiments, the content selection module 335 includes content items eligible for presentation to the user in one or more selection processes, which identify a set of content items for presentation to the user. For example, the content selection module 335 determines a measure of relevance of various content items to a user based on characteristics associated with the user by the venue management system 250 based on actions associated with the user by the venue management system 250, characteristics of the user maintained by the venue management system 250, preferences of the user maintained by the venue management system 250, and characteristics of content items eligible for presentation to the user. For example, the content selection module 335 determines measures of relevance to a user based on characteristics of the content items, characteristics of the user, and actions associated with the user. Based on the measures of relevance, the content selection module 335 selects one or more content items for presentation to the user (e.g., content items having at least a threshold measure of relevance, content items having highest measures of relevance relative to other content items). In some embodiments, the content selection module 335 ranks content items based on their associated measures of relevance and selects content items having the highest positions in the ranking or having at least a threshold position in the ranking for presentation to the user.

A content item may be associated with bid amounts specifying an amount of compensation received by the venue management system 250 from a third party system 130 or from a user if one or more criteria associated with the content item are satisfied. For example, a bid amount associated with a content item specifies an amount of compensation received by the venue management system 250 when the content item is presented to a user or when a user presented with the content item performs a specified type of interaction with the content item. The content selection module 335 uses the bid amounts associated with various content items when selecting content for presentation to the user. In various embodiments, the content selection module 335 determines an expected value associated with various content items based on their bid amounts and selects content items associated with a maximum expected value or associated with at least a threshold expected value for presentation to the user. An expected value associated with a content item represents an expected amount of compensation to the venue management system 250 for presenting a content item. For example, the expected value associated with a content item is a product of the content item's bid amount and a likelihood of the user interacting with the content item. The content selection module 335 may rank content items associated with bid amounts separately than content items that are not associated with bid amounts and select content items for presentation based on the separate rankings (e.g., content items having at least a threshold position in a ranking).

In some embodiment, the content selection module 335 selects content from the content store 310 and maps portions of the content to various client devices 210 within the venue 100 and executing an application associated with the venue management system 250. As further described below in conjunction with FIGS. 4-6C, the content selection module 335 maps portions of content, such as an image, to different client devices 210 based on locations of the client devices 210 within the venue 100. The content selection module 335 then communicates a message to a client device 210 including a portion of the content mapped to the client device 210, and the client device 210 presents the portion of the content mapped to the client device 210 on a display device of the client device 210 when an interaction with the application associated with the venue management system 250 is received. In various embodiments, the content selection module 335 selects content from the content store 310 based at least in part on an action currently happening in the venue (e.g., a red card being shown to a player in a soccer match). Alternatively, the content selection module 335 may receive content to be mapped to one or more client devices 210 from a third party system, or from one or more users of the venue management system 250 (e.g., a fan requesting a yellow card for a player of the opposing team in a soccer match). Content selected by the content selection module 335 may be an image, a video, or any other suitable content. For instance, a video of a flag waving may be selected for presentation by client devices 210 within the venue 110 by the content selection module 335 when the national anthem is played during a sporting event in the venue 100.

The web server 340 links venue management system 250 via the network 220 to one or more client devices 210, as well as to one or more third party systems 230. Additionally, the web server 340 may exchange information between the venue management system 250 and one or more vendor systems 240. The web server 340 serves web pages, as well as other content, such as JAVA®, FLASH®, XML and so forth. The web server 340 may receive and route messages between the venue management system 250 and a client device 210, for example, instant messages, queued messages (e.g., email), text messages, short message service (SMS) messages, or messages sent using any other suitable messaging technique. A user may send a request to the web server 340 to upload information (e.g., images or videos) that are stored in the content store 210. Additionally, the web server 340 may provide application programming interface (API) functionality to send data directly to native client device operating systems, such as IOS®, ANDROID™, WEBOS® or BlackberryOS.

Presenting Content within a Venue Using Client Devices within the Venue

Figure 4:
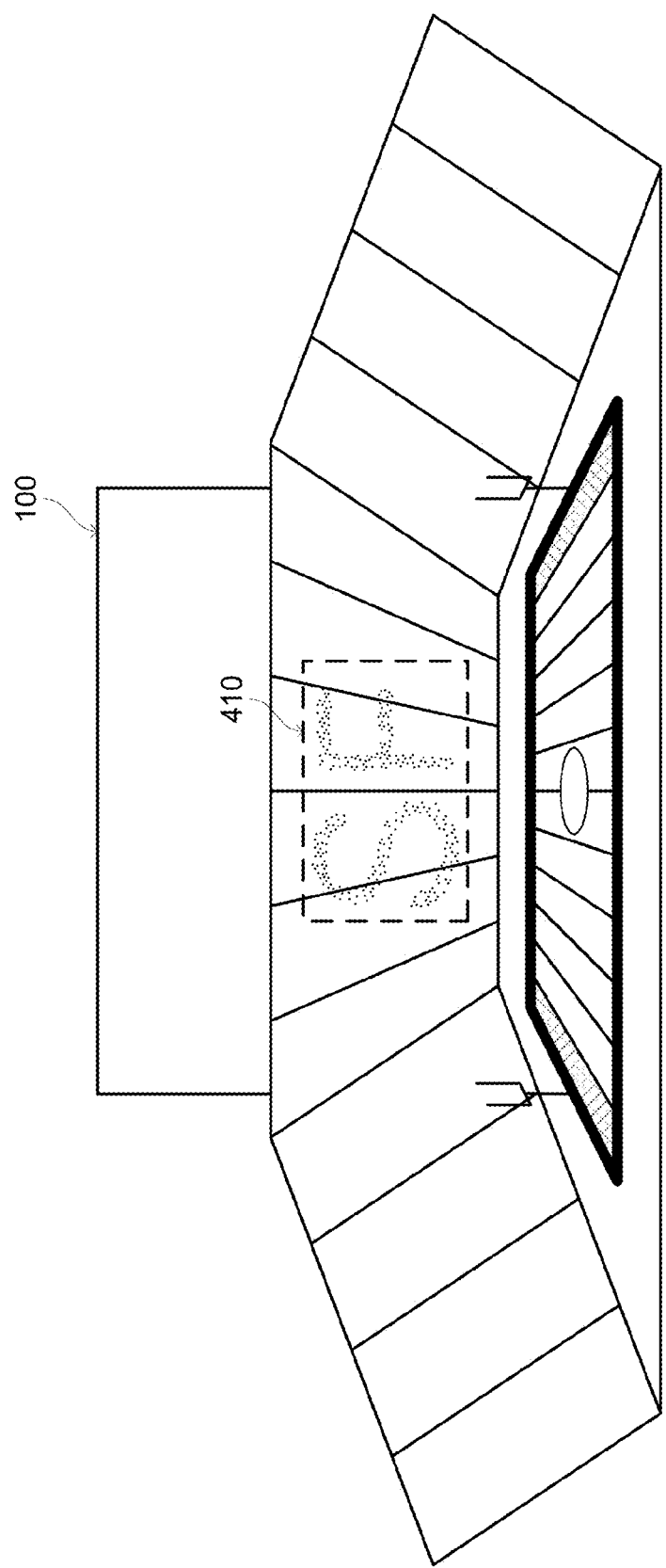
FIG. 4 is a view of a venue presenting content via client devices of users within the venue, in accordance with an embodiment.

FIG. 4 is an example of a venue 100 displaying content 410 using multiple client devices 210 within the venue 100. Each client device 210 may be associated with a user attending an event in the venue 100 and executing an application associated with a venue management system 250. In the example of FIG. 4, the content 410 displays the letters "SF." The content 410 displayed in the venue 100 may be an image selected by the venue management system 250 from content stored by the venue management system 250, retrieved by the venue management system 250 from a third party system, or received by the venue management system 250 from one or more users of the venue management system 250. In some embodiments, the venue management system 250 selects the content 410 for presentation based at least in part on an event occurring in the venue 100. For instance, the content 410 is an image of a flag for presentation during the singing of the national anthem before a sporting event in the venue 100.

In some embodiments, the content 410 displayed is selected by a user of the venue management system 250 operating a client device 210. For instance, a user communicates content to the venue management system 250 for presentation by client devices 210 within the venue 100 if the user believes a penalty should have been identified in a sporting event occurring within the venue 100. In some embodiments, the venue management system 250 identifies content received from at least a threshold number of users for presentation by client devices 210 within the venue. For example, content identifying a yellow card or yellow flag is identified for presentation by client devices 210 within the venue if at least a threshold number of users communicate the content to the venue management system 250. In one embodiment, locations within the venue 100 associated with users who request content for presentation are used by the venue management system 250 when selecting content 410 for presentation by client devices 210 within the venue 100. For example, the venue management system 250 selects content for presentation in a region 110 of the venue 100 if at least a threshold number of users associated with locations within the region 110 identify the content to the venue management system 250.

Figure 5:
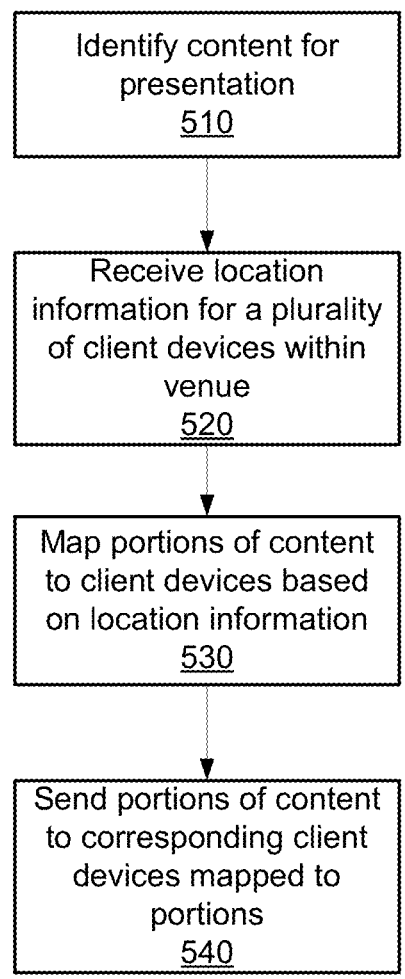
FIG. 5 is a flowchart of a method for displaying content within a venue using client devices of users within the venue, in accordance with an embodiment.

FIG. 5 is a flowchart of one embodiment of a method for displaying content within a venue 100 using client devices 210 within the venue 100. In some embodiment, the method includes different and/or additional steps than those described in conjunction with FIG. 5. Additionally, in various embodiments, steps of the method may be performed in different orders than the order described in conjunction with FIG. 5.

The venue management system 250 identifies 510 content for presentation within the venue 100. In various embodiments, the content may be selected from content stored by the venue management system 250, from content maintained by a third party system that communicates with the venue management system 250, or from content received by the venue management system 250 from one or more users (e.g., one or more users within the venue 100). For example, content identified 510 by the venue management system 250 is the image 610 illustrated in FIG. 6A, which is a static image showing the letters "SF."

In some embodiments, the venue management system 250 accounts for events occurring within the venue 100 when identifying 510 content. For example, the venue management system 250 identifies 510 content associated with or related to one or more actions occurring during an event within the venue 100. As an example, content identified 510 by the venue management system 250 is related to an action that occurred during the event within the venue 110 at a time less than a threshold interval from a time when the venue management system 250 identified 510 the content. In another example, the venue management system 250 identifies 510 content in anticipation of one or more actions occurring within the event in a threshold interval from a current time.

The venue management system 250 receives 520 location information for multiple client devices 210 within the venue 100. In some embodiments, the venue management system 250 retrieves stored location information associated with client devices 210 or associated with users associated with the client devices 210 (e.g., seats assigned to users based on tickets purchased by the users). Alternatively, the venue management system 250 receives 520 location information from various client devices 210 within the venue 100 that identifies locations of the client devices 210. A location of a client device 210 may be determined by a position sensor 216 included in the client device 210, as further described above in conjunction with FIG. 2. In some embodiments, the venue management system 250 uses a location determined by a position sensor 216 included in a client device 210 to determine whether a location of user associated with the client device is within a threshold distance (e.g., 2 meters) of a location associated with the user by the venue management system 250 (e.g., a seat assigned to the user). If the venue management system 250 determines the location of the user is within the threshold distance of the location associated with the user by the venue management system 250, the venue management system 250 uses the location associated with the user by the venue management system 250 (e.g., a seat assigned to the user) as the location of the user. If the location determined by the position sensor 216 in the client device 210 associated with the user is greater than the threshold distance from the location associated with the user by the venue management system 250, the venue management system 250 uses the location determined by the position sensor in the client device 210 associated with the user as the location of the user.

Figure 6B:
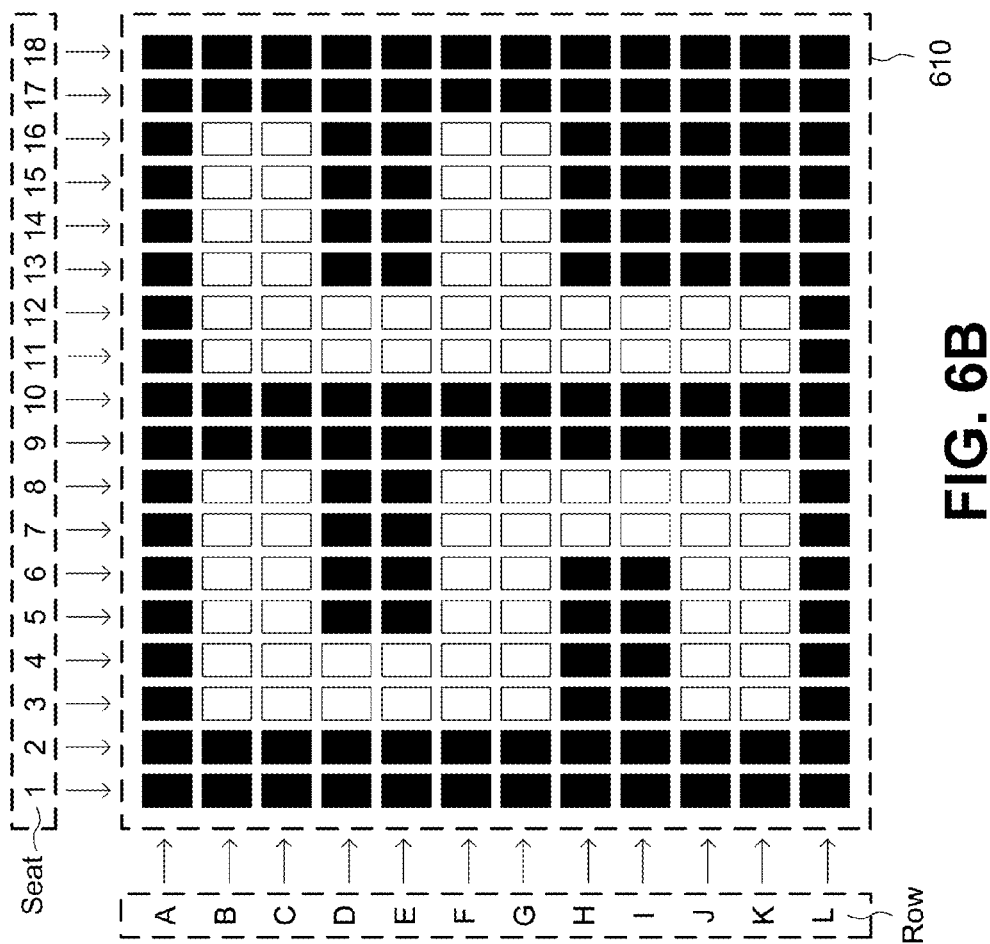
FIG. 6B is an example mapping between the image of FIG. 6A and client devices of users within a venue, in accordance with an embodiment.
Figure 6A:
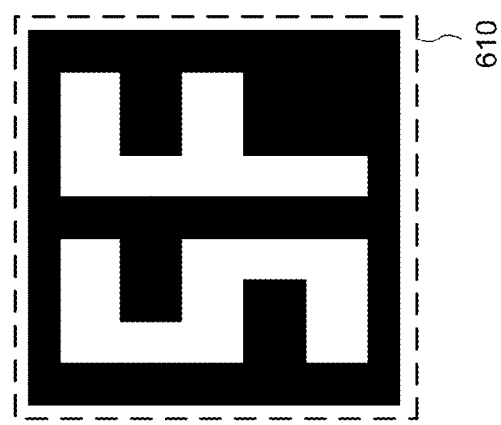
FIG. 6A is an example of content to be presented within a venue by client devices within the venue, in accordance with an embodiment.

Based at least in part on location information received 520 from various client devices 210, the venue management system 250 maps 530 portions of the identified content to different client devices 210. Referring to FIG. 6B, an example mapping 530 of image 610 to different client devices 210 is shown. In the example of FIG. 6B, portions of image 610 are mapped to client devices 210 of users based on locations associated with the users by the venue management system 250, such as seat locations of the users. For instance, the portion of image 610 located in the top left corner is mapped to a client device 210 of a user assigned to row A, seat 1, while and the portion of image 610 located at the bottom right corner is mapped to a client device of a user assigned to row L, seat 18.

In one embodiment, the venue management system 250 maps 520 each client device 210 to a different portion of the identified content. In other embodiments, multiple client devices 210 within a threshold distance of each other are mapped 530 to a common portion of the identified content. Further, multiple adjacent portions of the identified content (e.g., multiple adjacent pixels of an image) may be mapped 530 to a single client device 210.

The venue management system 250 subsequently sends 540 portions of the identified content to the client devices 210 executing an application associated with the venue management system 250 and mapped to the various portions of the identified content. If multiple portions of the identified content are mapped 520 to a client device 210, the venue management module 250 may send 540 each of the multiple portions of the identified content to the client device 210 for display. Alternatively, if multiple adjacent portions of the identified content are mapped 530 to a client device 210, the venue management module 250 may send 540 the client device 210 an average of the portions of the identified content mapped 530 to the client device 210 (e.g., an average value of pixels in an image mapped 540 to the client device 210).

To display the identified content, the display devices 212 of the client devices 210 that received portions of the identified content display the portions of the identified content. For example, when a user of a client device 210 interacts with an application executing on the client device 210 and associated with the venue management system 250, a display device 212 of the client device 210 presents the portion of the identified content received by the client device 210 from the venue management system 250. Hence, display devices 212 of various client devices 210 act as various pixels of the identified content, if the identified content is an image.

Figure 6C:
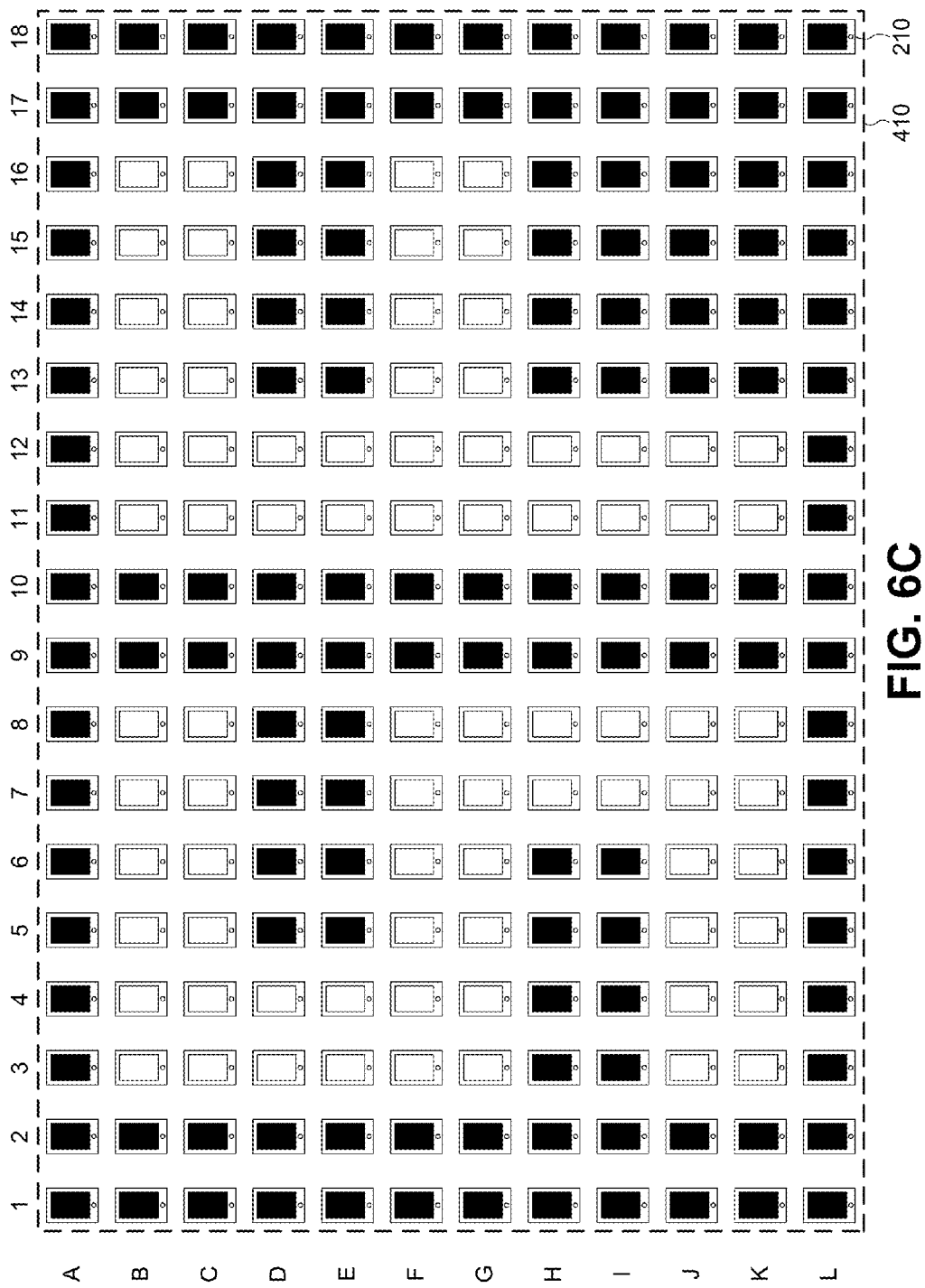
FIG. 6C is a diagram of client devices within the venue displaying the image of FIG. 6A, in accordance with an embodiment.

Referring to FIG. 6C, an example presentation of content in a venue 100 using display devices 212 of client devices 210 within the venue 100. In the example of FIG. 6C, a subset of client devices 210 receive a specific color from the image 610 (e.g., black) from the venue management system 250 and display the specific color. Additionally, another subset of client devices 210 receive an alternative color from the image 610 (e.g., white) and display the alternative color, so the combination of content presented by display devices 212 of client devices 210 in the subset and in the additional subset present the image 610.

In some embodiments, the portion of the identified content displayed by a display device 212 of a client devices 210 changes over time. For example, a color displayed by a display device 212 of a client device 210 changes over time to allow presentation of a moving picture or a video. As an example, colors presented by display devices 212 change over time as a song playing in the venue 100 produces different sounds. In some embodiments, the venue management system 250 sends 540 multiple portions of the identified content to a client device 210 along with instructions for the client device 210 to select a portion of the identified content for presentation at different times (e.g., times from a current time associated with presentation of different portions of the identified content). Alternatively, the venue management system 250 sends 540 different portions of the identified content to the client device 210 at different times to modify the content presented by the client device 210 at different times.

To present the portion of the identified content received by a client device 210, a user associated with the client device 210 interacts with an application executing on the client device 210 and associated with the venue management system 250. The application may identify a direction or an orientation of the client device 210 for presenting the portion of the identified content. For example, the application identifies a vertical orientation of a display device 212 of the client device 210 and a direction where the display device 212 faces a location within the venue 100. In some embodiments, the application executing on client device 210 uses a gyroscope or a compass included in the client device 210 to determine whether the client device 210 has the direction or the orientation for presenting the portion of the identified content and presents a message to a user associated with the client device 210 to reorient the client device 210.

The client devices 210 may send orientation information to the venue management system 250 describing directions or orientations of the client devices 210 while presenting portions of the identified content. For instance, a client device 210 communicates angular information determined by a gyroscope in the client device 210 and direction information determined by a compass in the client device 210 to the venue management system 250. Based on the angular information and direction information, the venue management system 250 determines whether the client device 210 is correctly displaying the portion of the identified content. If venue management system 250 determines the client device 210 is not correctly displaying the portion of the identified content, the venue management system 250 may send a message to the client device 210 for the user to correct the orientation of the client device 210. For example, if direction information received from a client device 210 indicates the client device 210 is pointing north when the identified content is to be presented to the south, the venue management system 250 may send a message to client device 210 notifying the user of a direction to present the display device 212 of the client device 210 (e.g., to direct the display device 212 to the south). In another example, the venue management system 250 determines the client device 210 is horizontally oriented based on angular information determined by a gyroscope of the client device 210 and provided to the venue management system 250, and sends a notification to a user of the client device 210 to vertically orient the client device 210 when presenting the portion of the identified content.

In other embodiments, the venue management system 250 sends 540 a request to a client device 210 within the venue 100 including a portion of the identified content mapped 530 to the client device 210 executing an application associated with the venue management system 250. If the client device 210 is currently presenting content from the application associated with the venue management system 250, the application may automatically present the portion of the identified content included in the request. Alternatively, the application prompts the user whether to present the portion of the identified content included in the request. If the client device 210 is not currently presenting content from the application associated with the venue management system 250, the client device 210 presents a notification to the user that content has been received from the application and prompts the user to present content from the application via the client device 210.

The client device 210 may modify one or more display settings when presenting the portion of the identified content received from the venue management system 250. For example, an application executing on the client device 210 and associated with the venue management system 250 maximizes a brightness of a display device 212 of the client device 210 when presenting the portion of the identified content received from the venue management system. In other embodiments, the venue management system 250 determines a density of client devices 210 in different regions 110 of the venue 100 and sends instructions to client devices 210 along with the portions of the identified content mapped 530 to the client devices 210 that, when executed by the client devices 210, adjust brightness of display devices 212 of each client device 210 based on the density of client devices 210 in each region 110 of the venue 100, the sizes of display devices 212 of various client devices 210, and maximum brightnesses of display devices 212 of various client devices 210. For example, the venue management module 250 communicates instructions to client devices 210 so brightnesses of display devices 212 of client devices 210 in regions 110 with less than a threshold density of client devices 210 (i.e., regions with a small number of client devices 210 receive portions of the identified content) to a maximum brightness, and so an average brightness of display devices 212 of client devices 210 in regions with greater than the threshold density of client devices 210 matches an average brightness of display devices 212 in regions with less than the threshold density of client devices 210. In another example, the venue management system 250 communicates instructions to a client device 210 that determines a brightness for the client device 210 based at least in part on a size of the display device 212 of the client device 210 (e.g., a larger size display device 212 may have a lower brightness than a smaller size display device 212).

The venue management system 250 may determine a density of client devices 210 in a region 110 by communicating a request to client devices 210 having locations within the region 110. Client devices 210 presenting portions of the identified content from the venue management system 250 communicate a confirmation to the venue management system 250, while client devices 210 not presenting portions of the identified content provide no response to the venue management system 250 or provide a declination message to the venue management system 250. A ratio of the number of confirmations received by the venue management system 250 to a number of client devices 210 in the region 110 or to an area of the region 110 determines the density of client devices 210 in the region 110. The venue management system 250 may periodically determine the density of client devices 210 in various regions 110 and modify instructions sent to client devices 210 for presenting content identified by the venue management system 250 based on the determined densities of client devices 210.

In some embodiments, the venue management system 250 provides a reward to users who present portions of content identified 510 by the venue management system 250. For instance, the venue management system 250 provides a coupon for use at a vendor 120 within the venue 100 to a user associated with a client device 210 that presented a portion of the identified content. The venue management system 250 may provide a reward to user who presents a portion of the identified content on their associated client devices 210 for at least a threshold amount of time or at least a threshold number of times in various embodiments.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving location information from a plurality of client devices within a venue;
identifying content for presentation at the venue;
mapping portions of the identified content to client devices of the plurality of client device based at least in part on location information received from the plurality of client devices by:
mapping a portion of the identified content to one or more client devices from which location information within an area of the venue was received, and
mapping an additional portion of the identified content to one or more additional client devices from which location information within another area of the venue was received;
sending the portion of the identified content to the one or more client devices;
sending the additional portion of the identified content to the one or more additional client devices
determining a number of the client devices from which location information within the area of the venue was received;
determining a number of the additional client devices from which location information within the other area of the venue was received;
sending an instruction to the client devices from which location information within the area was received to modify a brightness of one or more of the client devices from which location information within the area was received based at least in part on the number of the client devices from which location information within the area of the venue was received; and
sending an instruction to the additional client devices from which location information within the other area was received to modify a brightness of one or more of the additional client devices from which location information within the other area was received based at least in part on the number of the additional client devices from which location information within the other area of the venue was received.

2. The method of claim 1, wherein receiving location information from a client device comprises receiving a location determined by a location sensor included in the client device.

3. The method of claim 1, wherein receiving location information from a client device within the venue comprises identifying a location within the venue associated with a user associated with the client device.

4. The method of claim 3, wherein the location within the venue associated with the user associated with the client device comprises a seat within the venue assigned to the user.

5. The method of claim 1, wherein the identified content comprises an image.

6. The method of claim 5, wherein mapping the portion of the identified content to one or more client devices from which location information within the area of the venue was received comprises:
mapping a pixel of the image to a client device from which location information within the area of the venue was received.

7. The method of claim 6, wherein mapping the additional portion of the identified content to one or more additional client devices from which location information within another area of the venue was received comprises:
mapping an additional pixel of the image to an additional client device from which location information within the other area of the venue was received.

8. The method of claim 1, wherein the content is identified based at least in part on one or more actions occurring in an event occurring within the venue.

9. The method of claim 1, wherein sending the portion of the identified content to the one or more client devices comprises:
sending the portion of the identified content to the one or more client devices along with information describing directions or orientations of the one or more client devices when presenting the portion of the identified content.

10. The method of claim 1, wherein sending the portion of the identified content to the one or more client devices comprises:

sending the portion of the identified content to the one or more client devices along with information describing one or more brightnesses of display devices of the one or more client devices when presenting the portion of the identified content.

11. A method comprising:
receiving location information from a plurality of client devices within a venue;
identifying content for presentation at the venue;
mapping portions of the identified content to different client devices of the plurality of client device based at least in part on location information received from the plurality of client devices;
sending portions of the identified content to the client devices, a portion of the identified content sent to a client device to which the portion of the identified content was mapped;
determining a number of the plurality of client devices from which location information within an area of the venue was received;
determining a number of the plurality of client devices from which location information within an additional area of the venue was received;
sending an instruction to the client devices of the plurality of client devices from which location information within the area was received to modify a brightness of one or more of the client devices of the plurality of client devices from which location information within the area was received based at least in part on the number of the client devices of the plurality of client devices from which location information within the area of the venue was received; and
sending an instruction to the client devices of the plurality of client devices from which location information within the additional area was received to modify a brightness of one or more of the additional client devices of the plurality of client devices from which location information within the additional area was received based at least in part on the number of the client devices of the plurality of client devices from which location information within the additional area of the venue was received.

12. The method of claim 11, wherein receiving location information from a client device comprises receiving a location determined by a location sensor included in the client device.

13. The method of claim 11, wherein receiving location information from a client device within the venue comprises identifying a location within the venue associated with a user associated with the client device.

14. The method of claim 13, wherein the location within the venue associated with the user associated with the client device comprises a seat within the venue assigned to the user.

15. The method of claim 11, wherein the identified content comprises an image.

16. The method of claim 15, wherein mapping portions of the identified content to different client devices of the plurality of client device based at least in part on location information received from the plurality of client devices comprises:
mapping a pixel of the image to a client device from which location information identifying a specific location was received.

17. The method of claim 11, wherein the content is identified based at least in part on one or more actions occurring in an event occurring within the venue.

* * * * *

UNITED STATES PATENT AND TRADEMARK OFFICE
CERTIFICATE OF CORRECTION

PATENT NO. : 9,544,618 B1
APPLICATION NO. : 14/803701
DATED : January 10, 2017
INVENTOR(S) : Bhatt et al.

Page 1 of 1

It is certified that error appears in the above-identified patent and that said Letters Patent is hereby corrected as shown below:

In the Claims

Claim 1, Column 19, Line 58, delete "device" and insert --devices--
Claim 11, Column 21, Line 11, delete "device" and insert --devices--
Claim 16, Column 22, Line 25, delete "device" and insert --devices--

Signed and Sealed this
Eighth Day of August, 2017

Joseph Matal
*Performing the Functions and Duties of the*
*Under Secretary of Commerce for Intellectual Property and*
*Director of the United States Patent and Trademark Office*